F. E. ALDRICH.

MACHINE FOR MANUFACTURING RUBBER CLOTH.

No. 10,325. Reissued May 15, 1883.

Witnesses:
H. E. Prentiss
L. J. White

Inventor
Frank E. Aldrich,
Per C. C. Shaw,
Atty.

UNITED STATES PATENT OFFICE.

FRANK E. ALDRICH, OF BOSTON, MASSACHUSETTS.

MACHINE FOR MANUFACTURING RUBBER CLOTH.

SPECIFICATION forming part of Reissued Letters Patent No. 10,325, dated May 15, 1883.

Original No. 235,117, dated December 7, 1880. Application for reissue filed March 9, 1883.

*To all whom it may concern:*

Be it known that I, FRANK E. ALDRICH, of Boston, in the county of Suffolk and State of Massachusetts, have invented a certain new and useful Improvement in Machines for Manufacturing Rubber Cloth, of which the following is a description sufficiently full, clear, and exact to enable any person skilled in the art or science to which said invention appertains to make and use the same, reference being had to the accompanying drawings, forming a part of this specification, in which--

Figure 3:
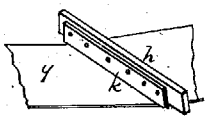
Figure 4:
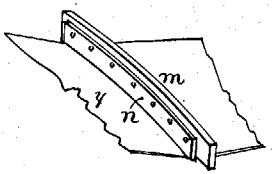
Figure 1:
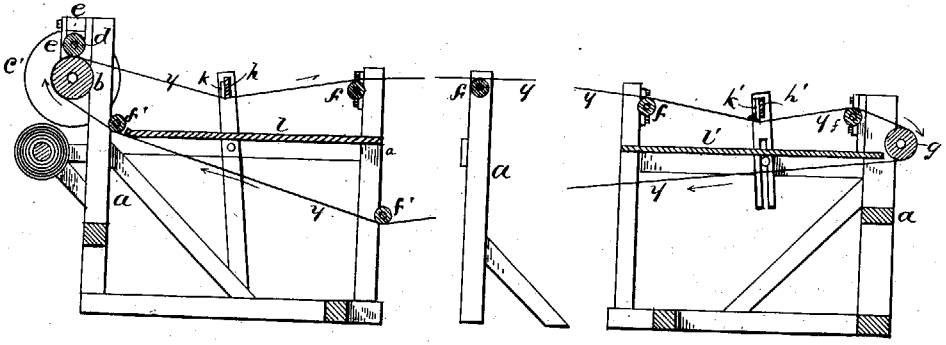
Figure 2:
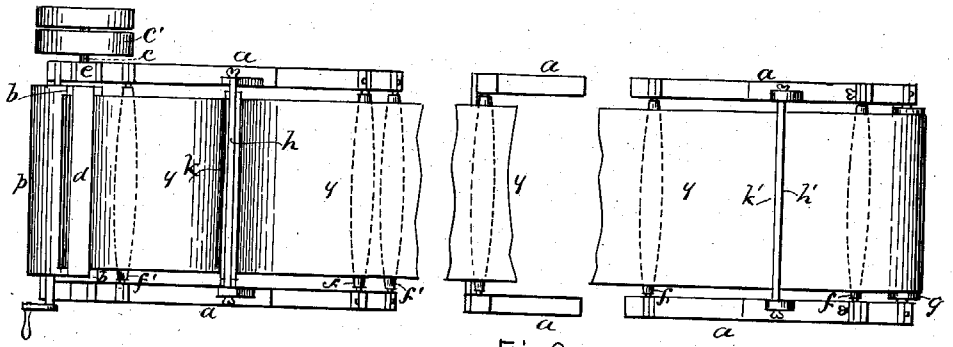

Figure 1 is a vertical longitudinal section of my improved machine; Fig. 2, a top plan view of the same; Fig. 3, a perspective view of a straight knife; Fig. 4, a view showing the lateral curvature of the knife.

Like letters of reference indicate corresponding parts in the different figures of the drawings.

My invention relates to mechanism for applying the coating to the cloth; and it consists in a novel construction and arrangement of the parts, as hereinafter more fully set forth and claimed, by which a more effective device of this character is produced than was in ordinary use at the date when said invention was made.

The nature and operation of the improvement will be readily understood by all conversant with such matters from the following explanation.

In the drawings, *a* represents the frame of the machine, *b* the main roll, and *g* the counter-roll.

The roll *b* is journaled horizontally on the shaft *c* at one end of the machine, in the upper part of the frame *a*, and provided with a driving-pulley, *c'*. The counter-roll *g* is journaled in like manner opposite the main roll, and is somewhat smaller or of less diameter than the main roll, though not necessarily so.

Between the main and counter rolls, and journaled horizontally at proper intervals in the upper part of the frame, are a series of supporting-rolls, *f*, and beneath these, disposed in the center or lower part of the frame-work, are a corresponding series of stretching or guide rolls, *f'*. Both the supporting and guide rolls are elliptical in form, or of a greater diameter at their centers than at their ends, and have a tendency to stretch the fabric laterally, thereby preventing longitudinal wrinkling and obviating the necessity of stretching or smoothing it by hand.

The cloth *y* to be coated is made into an endless belt, and passes from the main or driving roll *b* over the supporting-rolls *f*, around the counter-roll *g*, and back under the stretching or guide rolls *f'* to the main roll *b*.

A spreading-knife, *k*, attached to the support *h*, and usually made adjustable therein, is arranged near the main roll *b*, and between said roll and the first supporting-roll *f*. This knife is inclined toward the roll *b*, and reaches entirely across the cloth or fabric, being so adjusted as to press firmly thereon.

A supplementary spreading-knife, *k'*, attached to the adjustable support *h'* and inclined toward the roll *b*, is disposed near the counter-roll *g*, this knife also stretching across the fabric and being adjusted to press thereon, like the main knife *k*.

In the use of my improvement, power is applied to the pulley *c'*, causing the main and counter rolls to revolve and the cloth to traverse in the direction of the arrows in Fig. 1. The rubber or liquid coating is then poured upon the cloth in front of each of the knives *k k'*, which, as the cloth passes under the same, presses the coating into the fabric and spreads it evenly, the surplus or overflow falling into the drip pans *l l'*, which are supported in the frame beneath the knives, as shown in Fig. 1.

A pressure-roller, *d*, journaled to move vertically in the auxiliary frame *e* in parallelism with the roller *b*, and working in conjunction therewith, supplements the work of the knives by pressing the coating into the fabric, and also calenders or finishes the cloth.

In some of the machines constructed prior to my invention the endless belt of cloth passes a main driving-roll, *b*, under a knife, *k*, and perhaps over rolls of even thickness to a counter-roll, *g*, thence back to roll *b*, and so on until, say, ten to forty coats have been applied, the process being a very slow one, as the entire belt of cloth has to be returned to the single knife at each coating.

In my improved machine the process is greatly expedited by the employment of a supplemental knife in combination with the main knife, the knives being arranged at a sufficient distance apart to permit the coating to be properly dried after passing the first or main knife before it reaches the second or supplemental knife.

The knife as ordinarily constructed in machines of this character is straight and set so as to incline or tip toward the approaching fabric; but it has been found that the coating-liquid, when poured in front of a straight knife, has a tendency to flow too rapidly toward the edges of the fabric, thus leaving the center improperly supplied. To obviate this objection I curve the knife, as shown at *n* in Fig. 4, and attach it to a curved support, *m*, or so construct and arrange it that it will present a concave front to the approaching fabric and liquid. The curve should be just sufficient to overcome the tendency of the liquid to flow to the sides of the fabric, and to produce an even coat throughout its width. A corresponding downward curve is given to the edge of the knife, its center being lowest, with a gradual upward slope toward either end to enable it to be inclined or tipped toward the approaching fabric without having its edge at the center withdrawn from contact therewith, the convexity of the edge being such that it will be horizontal when the body of the knife is properly inclined to the cloth, as described.

I denominate the roll *g* the "counter-roll," in contradistinction to the main roll *b*, and for the reason that it changes the traverse or course given to the cloth by the main roll in passing through the machine.

Having thus explained my invention, what I claim is—

1. A machine for applying the coating material in the manufacture of rubber cloth, having a main roll, a counter-roll, and two spreading-knives, the knives being disposed on the line of traverse pursued by the cloth and adapted to press thereon, in combination with means for properly supporting the cloth and presenting it to the action of the knives, substantially as set forth.

2. The herein-described machine for applying the coating material in the manufacture of rubber cloth, the same consisting of the frame *a*, main roll *b*, counter-roll *g*, knives *k* *k'*, supporting-rolls *f*, guide-rolls *f'*, and operative mechanism, combined and arranged to work substantially as specified.

3. In a machine for applying the coating material in the manufacture of rubber cloth, the roll *d*, in combination with the rolls *b g*, knife *k*, and frame *e*, substantially as and for the purpose set forth.

4. In a machine for applying the coating material in the manufacture of rubber cloth, the elliptical rolls *f*, in combination with the rolls *b g* and knife *k*, substantially as and for the purpose specified.

5. In a machine for applying the coating material in the manufacture of rubber cloth, the knife *n*, curved laterally to present a concave front to the approaching fabric and coating material, and vertically to permit the body of the knife to be inclined and still keep its edge properly in contact with the fabric, substantially as shown and described.

FRANK E. ALDRICH.

Witnesses:
C. A. SHAW,
L. J. WHITE.